United States Patent
Mattar et al.

(10) Patent No.: US 10,908,003 B2
(45) Date of Patent: Feb. 2, 2021

(54) VORTEX FLOWMETER INCLUDING PRESSURE PULSATION AMPLITUDE ANALYSIS

(71) Applicant: Schneider Electric Systems USA, Inc., Foxboro, MA (US)

(72) Inventors: Wade Mattar, Wrentham, MA (US); Peter Allstrom, Warwick, RI (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 0 days.

(21) Appl. No.: 16/943,952

(22) Filed: Jul. 30, 2020

(65) Prior Publication Data

US 2020/0355528 A1    Nov. 12, 2020

Related U.S. Application Data

(63) Continuation of application No. 14/532,542, filed on Nov. 4, 2014, now Pat. No. 10,788,344.

(51) Int. Cl.
*G01F 1/32*    (2006.01)

(52) U.S. Cl.
CPC .......... *G01F 1/3254* (2013.01); *G01F 1/3209* (2013.01)

(58) Field of Classification Search
CPC . G01F 1/00; G01F 1/32; G01F 1/3209; G01F 1/3254; G01F 1/3236; G01F 1/329; G01F 15/024; G01F 1/3245; G06F 19/00; G01G 1/34; G01N 29/02; G01N 29/022; A61M 16/0051

See application file for complete search history.

(56) References Cited

U.S. PATENT DOCUMENTS

| | | | |
|---|---|---|---|
| 3,776,033 A | * | 12/1973 | Herzl .................... G01F 1/3236 73/861.22 |
| 4,010,645 A | | 3/1977 | Herzl |
| 4,048,854 A | | 9/1977 | Herzl |
| 4,240,299 A | | 12/1980 | Joy et al. |
| 4,807,481 A | | 2/1989 | Lew |
| 4,972,723 A | | 11/1990 | Lew |
| 5,005,426 A | | 4/1991 | Lew |
| 5,060,522 A | | 10/1991 | Lew |

(Continued)

FOREIGN PATENT DOCUMENTS

WO    89/05966    6/1989

*Primary Examiner* — Regis J Betsch
*Assistant Examiner* — Kaleria Knox
(74) *Attorney, Agent, or Firm* — Stinson LLP

(57) ABSTRACT

A configuration tool is for a vortex flowmeter having a flowtube, a bluff body positioned in the flowtube for shedding vortices in the fluid, and a pressure sensor configured to obtain a signal indicative of a time-varying fluid pressure having an oscillation associated with the vortices. The configuration tool includes a processor that determines a type of fluid flowing through the flowtube based on the amplitude of the oscillation. The processor sets a fluid-type setting of the vortex meter to match the determined type of fluid. An alarming system for a control system including such a flowmeter includes a processor that assesses a density of a fluid flowing through the flowtube based on the amplitude and compares the assessed density to a fluid density configuration setting. The processor activates an alarm if the difference between the assessed density and the fluid density configuration setting exceeds a threshold.

20 Claims, 5 Drawing Sheets

(56) References Cited

U.S. PATENT DOCUMENTS

| | | |
|---|---|---|
| 5,090,251 A | 2/1992 | Lew |
| 5,095,760 A | 3/1992 | Lew |
| 5,121,658 A | 6/1992 | Lew |
| 5,520,333 A | 5/1996 | Tofte |
| 5,942,696 A | 8/1999 | Kleven |
| 6,053,053 A | 4/2000 | Huotari |
| 6,076,392 A * | 6/2000 | Drzewiecki ....... A61M 16/0051 73/23.2 |
| 6,412,353 B1 * | 7/2002 | Kleven ................ G01F 1/3254 73/861.22 |
| 6,480,812 B1 * | 11/2002 | Wada ..................... G01F 1/329 702/191 |
| 6,484,590 B1 | 11/2002 | Kleven et al. |
| 6,651,512 B1 | 11/2003 | Kleven et al. |
| 6,957,586 B2 | 10/2005 | Sprague |
| 7,013,740 B2 | 3/2006 | Dutton et al. |
| 7,258,024 B2 | 8/2007 | Dimarco et al. |
| 7,366,621 B2 | 4/2008 | Sprague |
| 7,617,055 B2 | 11/2009 | Henry et al. |
| 7,895,904 B2 | 3/2011 | Matsubara et al. |
| 8,621,937 B2 | 1/2014 | Henry |
| 2004/0049358 A1 * | 3/2004 | Cook .................... G01F 15/024 702/45 |
| 2005/0210998 A1 * | 9/2005 | Dimarco ............... G01F 1/3245 73/861.22 |
| 2005/0262944 A1 * | 12/2005 | Bennett ................ G01N 29/022 73/592 |
| 2006/0190099 A1 | 8/2006 | Nangoy et al. |
| 2007/0191990 A1 | 8/2007 | Duan et al. |
| 2008/0034892 A1 | 2/2008 | Tombs et al. |
| 2011/0314929 A1 | 12/2011 | Limacher et al. |
| 2012/0024080 A1 | 2/2012 | Carbone, II et al. |
| 2014/0359086 A1 | 12/2014 | Smith et al. |
| 2015/0323357 A1 * | 11/2015 | Foster .................... E21B 43/34 73/861.02 |

* cited by examiner ined use of the vortex meter. For example, the information may include the type of fluid (e.g., liquid or gas), normal and maximum expected flow rate, normal and maximum expected temperature, normal and maximum pressure, expected density, expected viscosity, etc. The vortex meter is configured to optimize operation of the meter in the intended application based on the information provided. Although a vortex meter can operate with a wide range of fluid types and in a wide variety of conditions, a vortex meter may not provide accurate measurement if the configuration of the vortex meter does not match the application in which it is used. Vortex meters can be configured by the vendor based on information provided by the customer about the specific application for which the meter is intended. Alternatively, vortex meters can be configured or reconfigured in the field. For example, handheld device communicators can be connected to a vortex meter to configure or reconfigure the meter.

VORTEX FLOWMETER INCLUDING PRESSURE PULSATION AMPLITUDE ANALYSIS

CROSS-REFERENCE TO RELATED APPLICATION

The present application is a continuation of U.S. application Ser. No. 14/532,542, filed Nov. 4, 2014, the entire disclosure of which is incorporated herein by reference.

FIELD

The present invention relates generally to vortex flowmeters.

BACKGROUND

Flowmeters may measure the rate of flow of a fluid in a pipe or other pathway. The fluid may be, for example, a gas or a liquid, and may be compressible or incompressible. One type of flowmeter is a vortex flowmeter which measures parameters including, for example, flow rate based on the principle of vortex shedding. Vortex shedding refers to a natural process in which a fluid passing a bluff body (sometimes referred to as a shedder) causes a boundary layer of slowly moving fluid to be formed along the surface of the bluff body. A low pressure area is created behind the bluff body and causes the boundary layer to roll up, which generates vortices in succession on opposite sides of the bluff body. The frequency of the vortices is related to the flow rate. Thus, flow rate can be measured by detecting the vortices. For example, the vortices are associated with pressure variations in the fluid that may be detected by a pressure sensor.

The vortex frequency data can be used in conjunction with flow calibration factors to determine the velocity and volumetric flow rate of the fluid passing through the meter. If fluid density is known, the mass flow rate can also be computed. These measurements, and others, can be transmitted to a control room or other receiver over a communication line, such as, for example, a standard two-wire 4-20 milliamp ("mA") transmission line.

It has been recognized that the amplitude of the pressure oscillations associated with the vortices is related to the density of the fluid. In particular, if all other variables are equal a higher density fluid will result in increased amplitude in the oscillating pressure signal from inside the vortex meter. Moreover, the amplitude of the pressure oscillation is to a large extent proportional to the product of the fluid density and the square of the fluid velocity. There have been attempts to use this relationship between amplitude and density to calculate mass flow directly by combining a density measurement derived from analysis of the amplitude of the oscillation in the pressure signal with the ordinary volumetric flow measurement provided by standard vortex metering techniques. However, the results of these efforts have so far been unsatisfactory, apparently due to inability to limit error in the density measurement to satisfactory levels.

Vortex flowmeters have to be calibrated and configured for optimal performance in a particular application. In a typical scenario, when a customer orders a vortex flowmeter, the customer provides some basic information about the intended use of the vortex meter. For example, the information may include the type of fluid (e.g., liquid or gas), normal and maximum expected flow rate, normal and maximum However, there can be errors in the configuration for various reasons. For example, a vortex meter that is actually installed in a liquid line and which is supposed to be measuring flow of a liquid may accidentally be configured or reconfigured for use measuring flow rate of gas or steam. Similarly, a vortex meter that is installed in a gas line may be accidentally configured for use with a liquid. In either case, this may result in inaccurate measurement of flow by the vortex meter, which may not be readily apparent in some circumstances. Another type of error that can occur is there can be an error in a process or system that causes the wrong type of fluid to flow through a fluid line. For instance, a liquid line may be emptied of liquid (e.g., due to a liquid tank running empty or a leak). Similarly, a gas line may be flooded with liquid. In either case, the presence of the wrong type of fluid in a fluid line can be indicative of a problem that requires attention.

The present inventors have developed improvements to a vortex flowmeter that facilitates reliable configuration the vortex meter. The present inventors have also developed improvements to the ability of a vortex meter to provide information about the fluid flow monitored by the meter, including rapid updates about any changes in the fluid. The improvements are more fully outlined and described in detail below.

SUMMARY

One aspect of the invention is a method of configuring a vortex flowmeter. The method includes flowing a fluid through the vortex meter in a manner that produces a series of vortices in the fluid. A pressure sensor is used to obtain a signal indicative of a time-varying fluid pressure having an oscillation associated with the vortices. An amplitude of the oscillation of time-varying signal is determined and the vortex meter is configured to have a fluid-type setting that is based on said amplitude.

Another aspect of the invention is an alarming system for a control system including a vortex flowmeter of the type having a flowtube, a bluff body positioned in the flowtube for shedding vortices in a fluid when the fluid flows through the flowtube, and a pressure sensor positioned to obtain a signal indicative of a time-varying fluid pressure having an oscillation associated with the vortices. The alarming system includes a processor configured to determine an amplitude of the oscillation and to use the amplitude to assess a density of a fluid flowing through the flowtube. The processor is further configured to compare the assessed density of the fluid to a fluid density configuration setting of the vortex meter and activate an alarm when the difference between the assessed density and the fluid density configuration setting exceeds a threshold.

Yet another aspect of the invention is a vortex flowmeter. The vortex flowmeter has a flowtube, a bluff body positioned in the flowtube for shedding vortices in a fluid when the fluid flows through the flowtube, and a pressure sensor configured to obtain a signal indicative of a time-varying fluid pressure having an oscillation associated with the vortices. The vortex flowmeter has a processor configured to determine a frequency of the oscillation and an amplitude of the oscillation. The processor is further configured to determine a type of fluid flowing through the flowtube based on the amplitude of the oscillation and activate an alarm when the type of fluid flowing through the flowtube does not match a configuration setting of the vortex flowmeter for fluid type.

Still another aspect of the invention is a configuration tool for a vortex flowmeter of the type having a flowtube, a bluff body positioned in the flowtube for shedding vortices in a fluid when the fluid flows through the flowtube, and a pressure sensor configured to obtain a signal indicative of a time-varying fluid pressure having an oscillation associated with the vortices. The configuration tool includes a processor configured to determine a type of fluid flowing through the flowtube based on the amplitude of the oscillation and to set a fluid-type setting of the vortex meter to match the determined type of fluid.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
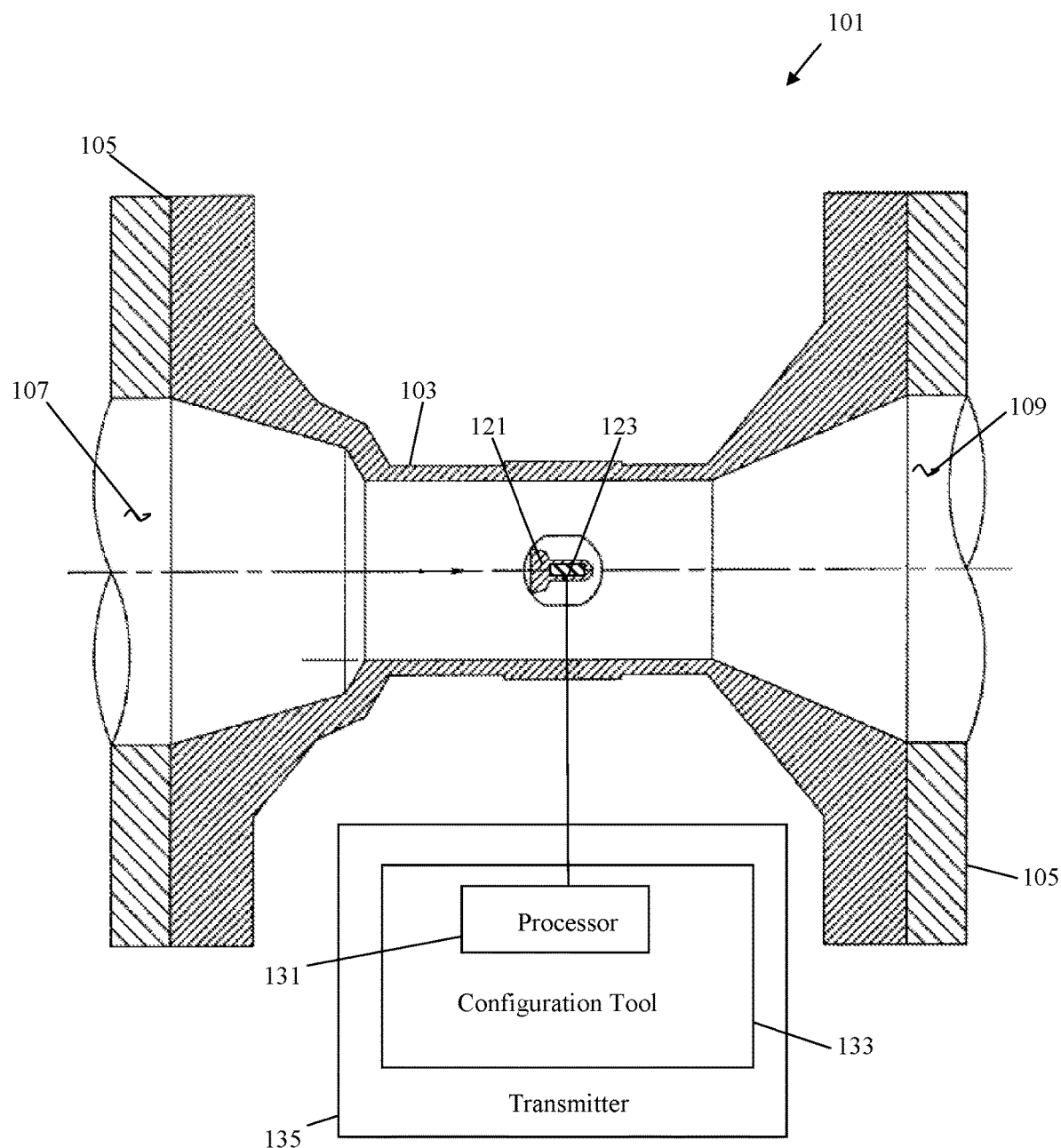
FIG. 1 is a schematic diagram of one embodiment of a vortex flowmeter.

Referring now to the drawings, first to FIG. 1, one embodiment of a vortex meter for measuring fluid flow rate is generally designated 101. The vortex meter 101 includes a flowtube 103 through which a fluid can flow. The flowtube 103 is suitably configured for installation in a fluid flow line (not shown). For example, process connections 105 (e.g., flanges) are on the opposite ends of the flowtube 103 for connecting the inlet 107 and outlet 109 of the flowtube to the ends of pipes in a pipeline. It is also common in the industry to use a so-called wafer connection to install a flowmeter in a fluid line and the flowtube can be adapted for a wafer connection (or any other type of connection) if desired.

A bluff body 121 (sometimes referred to in the industry as a vortex shedder or shedder bar) is positioned in the flowtube 103. The bluff body 121 is a structure that partially obstructs fluid flow through the flowtube 103 for the purpose of generating vortices in the fluid when the fluid flows through the flowtube. The vortex meter 101 includes a pressure sensor 123 configured to obtain a signal indicative of a time-varying fluid pressure having an oscillation associated with the vortices. As illustrated in FIG. 1, for example the pressure sensor 123 is suitably a differential pressure sensor mounted on a trailing end of the bluff body 121 so that the sensor is exposed to pressure on each side of the bluff body. The frequency of the vortices is generally proportional to the velocity of the fluid for a relatively wide range of flow conditions. Because the cross sectional flow area of the flowtube 103 is constant, the frequency of vortices is also proportional to the volumetric flow rate. This phenomenon is well known to those skilled in the art and need not be discussed in detail.

The vortex meter 101 has a processor 131 connected to the pressure sensor 123 and configured to receive a signal from the sensor that is indicative of the time-varying fluid pressure. The processor 131 is configured to determine a frequency of the oscillation. The processor 131 is also configured to determine an amplitude of the oscillation. The processor 131 is further configured to determine a type of fluid flowing through the flowtube based on the amplitude of the oscillation. For example, the processor suitably determines whether the fluid is a gas phase fluid or a liquid phase fluid using the amplitude. If the processor 131 determines that the amplitude is above a threshold amount, for example, the processor determines that the fluid is liquid because the relatively high amplitude indicates a high density. Moreover, if the processor 131 determines that the amplitude is above a threshold, the processor determines that the fluid is not a gas. Conversely, the processor 131 suitably determines that the fluid is a gas and not a liquid when the amplitude is lower than a threshold amount at a given frequency. The thresholds may be different and/or there may be amplitudes of the signal from the pressure sensor that are not clearly indicative of liquid or gas. However, in the majority of applications, there will be little uncertainty because of the large difference in density of most liquids and gases.

Figure 2:
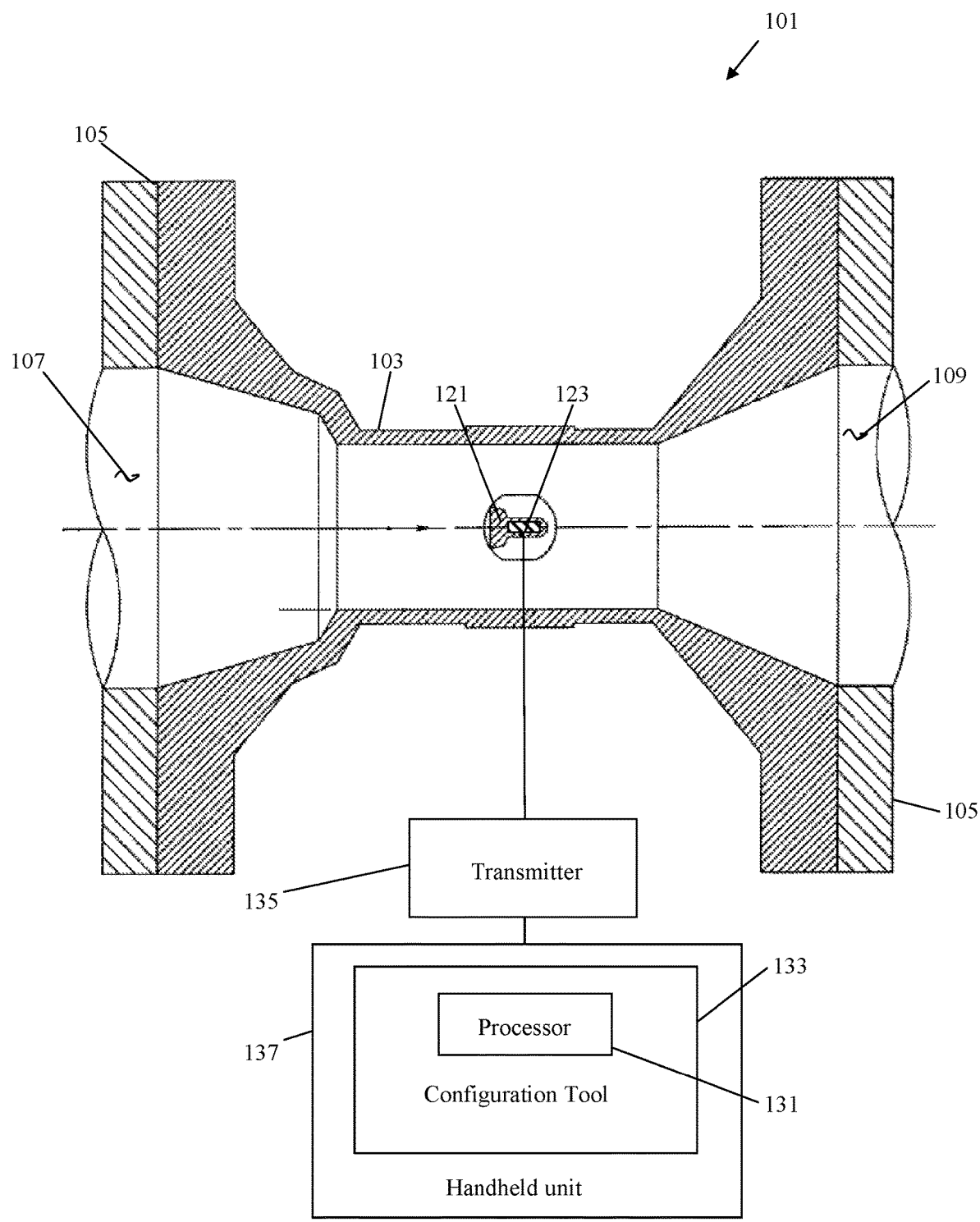
FIG. 2 is a schematic diagram of another embodiment of a vortex flowmeter.
Figure 3:
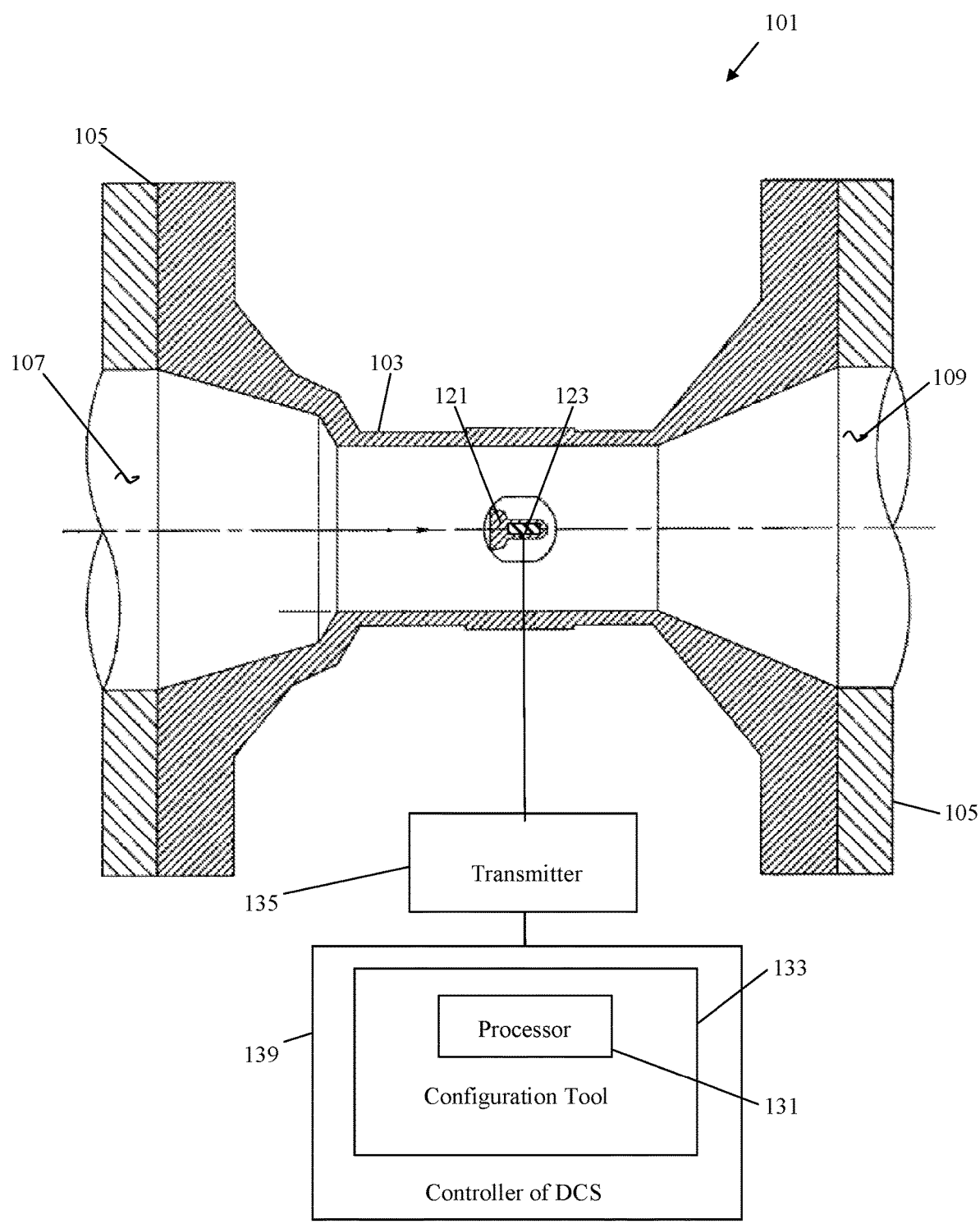
FIG. 3 is a schematic diagram of another embodiment of a vortex flowmeter.

As illustrated in FIG. 1, the processor 131 is configured (e.g., programmed) to be (or is a component of) a configuration tool 133 that facilitates configuration of the vortex flowmeter 101. For example, the configuration tool 133 is suitably a device type manager (DTM). Those skilled in the art understand a DTM is a standardized driver for field devices that are used in distributed control systems. DTMs must maintain interoperability so field devices from any device manufacturer can be used in conjunction with distributed control systems (or components thereof) from other manufacturers. It is understood, however, that the configuration tool does not have to be a DTM and other types of configuration tools are possible. The configuration tool 133 and processor 131 are suitably located within the housing of a transmitter for outputting information from the vortex flowmeter 101 about the flow rate of fluid through the flowtube 103 to a distributed control system. Alternatively, as illustrated in FIG. 2, the configuration tool 133 and processor 131 are suitably components of a hand held device that can be connected to the vortex flowmeter 101 for use by a technician. Still another possibility is that the configuration tool 133 and processor 131 are components of a remote device, such as a controller of a distributed control system (FIG. 3).

The configuration tool 133 is suitably configured to set a fluid-type setting of the vortex meter to match the determined type of fluid based on analysis of the amplitude of the signal from the sensor 123. This can reduce the amount of time required to configure the vortex flowmeter 101 during initial installation and/or verify a factory configuration is set properly.

Although there are times, such as during initial installation of the flowmeter 101, when it may be desirable for the processor 131 to set a fluid-type setting to match the determined type of fluid, there are other times when it may not be desirable to set a fluid type setting to match the determined type of fluid. The processor 131 is suitably also configured to activate an alarm when it determines the type of fluid flowing through the flowtube 103 does not match a configuration setting of the vortex flowmeter 101 for fluid type. For example, the processor 131 suitably activates an alarm during initial installation of the vortex flowmeter 101 if the determined fluid type does not match the factory setting, either in addition to or instead of setting the fluid type setting of the flowmeter 101 to match the determined fluid type.

To provide another example, a problem with a process controlled by a control system (e.g., a distributed control system) including the vortex meter 101 can result in the wrong type of fluid flowing through the vortex meter. Accordingly, the processor 131 is suitably configured as an alarming system for a control system including the vortex flowmeter 101. The alarming system 131 is suitably configured to activate an alarm when the determined fluid type does not match the type of fluid that is supposed to flow through the flowtube 103. As another example, the alarming system 131 is suitably configured to compare the assessed density of the fluid (based on the amplitude of the signal from the sensor 123) to a fluid density configuration setting of the vortex meter and activate an alarm when the difference between the assessed density and the fluid density configuration setting exceeds a threshold. This can be desirable, for example, when the fluid that flows through the flowmeter 101 during normal operation has a limited density range.

Those skilled in the art understand distributed control systems have various standardized protocols for receiving alarms from field devices such as the vortex meter 101, transmitting and recording information about alarms that are received, displaying information about alarms, and possibly taking corrective action in response to alarms. For example, the processor 131 and/or distributed control system is suitably configured to associate the alarm with a function block running in the distributed control system. The function block can be configured to implement a process plant control algorithm based at least in part on information received from the vortex flowmeter. To provide another example, the alarming system 131 is suitably configured to cause the transmitter 135 to output a heartbeat value as an alarm. In general, a heartbeat value is a pulse output at a rate that is outside the frequency range for a valid measurement. For example, the pulse output can have a frequency similar to a human heartbeat. Additional information about outputting a heartbeat value as an alarm is provided in U.S. Pat. No. 8,576,084, the contents of which are hereby incorporated by reference.

Figure 4:
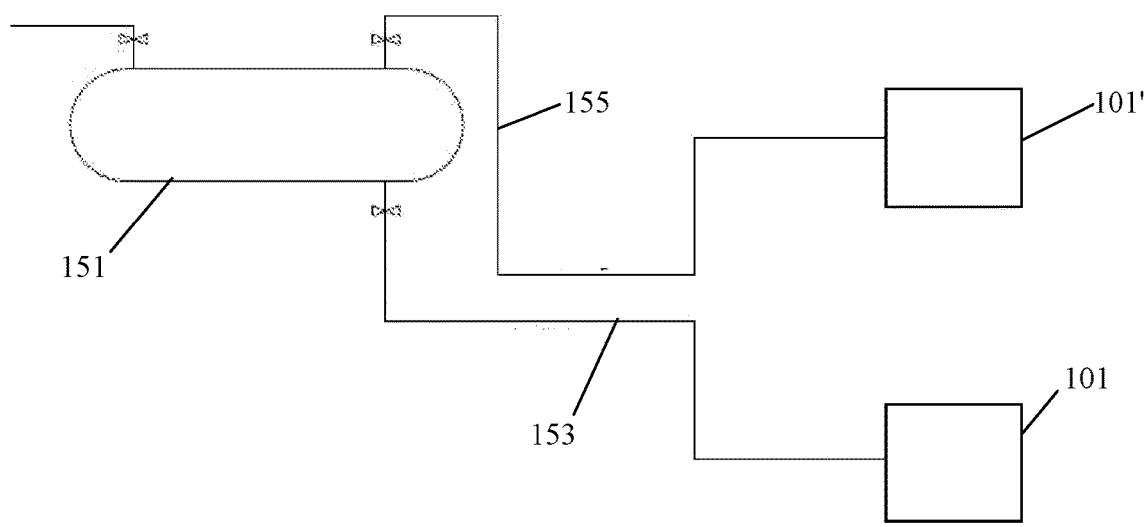
FIG. 4 is a schematic diagram of one embodiment of an oil and gas separation system including the vortex flowmeter.

The vortex flowmeter 101 can be used in any application that is suitable for conventional vortex flowmeters. Some specific examples will be described for further illustration, but other applications are understood to be within the broad scope of the invention. FIG. 4 shows the vortex meter 101 installed in a fluid line for conveying liquid away from an oil and gas separator 151. During normal operation of the separator 151 all of the liquid leaves the separator through a liquid line 153 and all of the gas leaves the separator through a gas line 155. However, in some circumstances the separator may be completely empty of liquid, which can result in gas carry-under—meaning gas is flowing through the liquid line 153. The processor 131 of the vortex meter 101 is suitably configured to detect gas carry-under by monitoring the amplitude of the signal from the sensor 123. If the amplitude drops below a threshold value the alarming system 131 suitably outputs an alarm (e.g., outputs a heartbeat value). In this case, one would normally not want the processor 131 to change the fluid type configuration setting from liquid to gas because the gas carry-under is expected to be a temporary condition and the typical response is to take corrective action to restore normal operation of the separator as soon as possible. FIG. 4 also shows another vortex meter 101' that is substantially identical to the vortex meter 101 installed in the gas line 155 to detect liquid carry-over in the gas line by monitoring the amplitude of the signal from the pressure sensor 123 for any increases in the amplitude that would indicate liquid instead of gas is flowing through the gas line.

To provide another example, the vortex meter 101 is suitably installed in a fluid line conveying wet steam. The vortex meter 101 is suitably a multivariable vortex meter configured to measure mass flow rate of fluid through the flowtube 103. When the vortex meter 101 is used in this application, it is expected that the phase of the fluid flowing through the flow tube may change from time to time (or the relative amounts of water and steam) depending on how much heat energy is depleted from the steam. Accordingly, the processor 131 is suitably configured to adjust the manner in which the vortex meter 101 calculates a fluid flow rate measurement based on the amplitude of the signal from the pressure sensor 123. For example, the processor 131 is suitably configured to adjust a fluid density setting of the vortex flowmeter based on the amplitude of the signal from the sensor 123. This adjustment can be performed by the processor 131 with or without alarms, depending on what is desired for the specific application.

Figure 5:
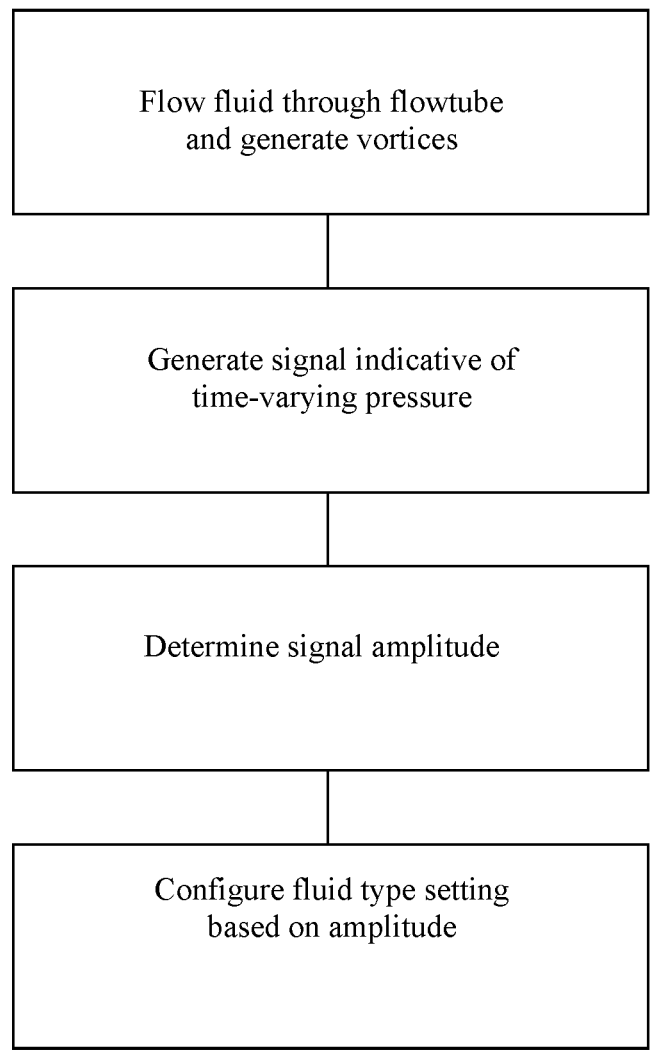
FIG. 5 is a flow diagram illustrating one embodiment of a method of the present invention.

One embodiment of a method of the present invention is illustrated in FIG. 5. Fluid is flowed through the vortex meter 101 in a manner that produces a series of vortices in the fluid. The pressure sensor 123 is used to obtain a signal indicative of a time-varying fluid pressure in the flowtube having an oscillation associated with the vortices. The processor 131 determines the amplitude of the oscillation of time-varying signal from the sensor and configures the vortex meter 101 to have a fluid-type setting that is based thereon. For example, the fluid-type setting is suitably set to liquid if the amplitude is relatively high and set to gas if the amplitude is relatively low. The method optionally includes adjusting a configuration setting for fluid density based on the amplitude. In particular, the fluid density setting is set relatively high if the amplitude is relatively high and is set relatively low if the amplitude is relatively low.

The processor 131 suitably uses additional information to determine the desired configuration setting. For example, it may be desirable in some circumstances to determine a configuration setting for the vortex meter 101 based in part on a temperature measurement. The temperature measurement may be obtained from a temperature sensor that is included in the vortex meter or from a separate temperature sensor.

The processor 131 and configuration tool 133 are suitably capable of configuring the vortex meter automatically. For example, the processor 131 and configuration tool 133 suitably automatically configure the vortex meter for use with a specified type of fluid based on the amplitude of the signal from the sensor 123 without any human intervention during the process of configuring the vortex meter for use with the specified type of fluid. For example, if a factory configuration setting for fluid type does not match the amplitude-based fluid-type determination, the processor 131 suitably automatically changes the configuration without any human intervention. The processor 131 optionally activates an alarm if it automatically changes a configuration setting. Alternatively, the processor 131 suitably activates an alarm if a factory configuration setting for fluid type does not match the amplitude-based fluid-type determination and changes the configuration only in response to a user input.

Furthermore, the method suitably includes monitoring the amplitude of the oscillation of the time-varying signal during use of the vortex meter (e.g. as a field instrument in a distributed control system). If the processor 131 determines that an incorrect fluid type is flowing through the vortex flowmeter 101 based on a change in the amplitude, it suitably activates an alarm that indicates an incorrect type of fluid is flowing through the vortex flowmeter.

Although the systems and methods described herein refer to a processor, it is recognized that programs or other executable program components associated with the systems and methods described herein may reside at various times in different storage components of a computing device. Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) to implement aspects of the invention. Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of the present invention of the preferred embodiments thereof, the articles "a", "an", "the", and "said" are intended to mean that there are one or more of the elements. The terms "comprising", "including", and "having" are intended to be inclusive and mean that there may be additional elements other than the listed elements.

In view of the foregoing, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

The invention claimed is:

1. An alarming system for a control system including a vortex flowmeter of the type having a flowtube, a bluff body positioned in the flowtube for shedding vortices in a fluid when the fluid flows through the flowtube, and a pressure sensor positioned to obtain a signal indicative of a time-varying fluid pressure having an oscillation associated with the vortices, the system comprising:
a processor; and
storage media storing one or more configuration settings for the vortex flowmeter, the configuration settings including a fluid density configuration setting indicating a density of fluid that is expected to flow through the vortex flowmeter, the storage media further storing processor-executable instructions that, when executed by the processor, configure the processor to:
determine a frequency of the oscillation and an amplitude of the oscillation based on the signal indicative of the time-varying fluid pressure obtained by the pressure sensor,
assess a density of a fluid flowing through the flowtube based on the amplitude,
compare the assessed density of the fluid to the fluid density configuration setting of the vortex meter,
activate an alarm when the difference between the assessed density and the fluid density configuration setting exceeds a threshold, and
output a flowrate measurement based on the determined frequency of the oscillation and the configuration settings stored in the storage media when the difference between the assessed density and the fluid density configuration setting is less than the threshold.

2. An alarming system as set forth in claim 1 wherein the control system is a distributed control system and the processor is further configured to associate the alarm with a function block running in the distributed control system, the function block being configured to implement a process plant control algorithm based at least in part on information received from the vortex flowmeter.

3. An alarming system as set forth in claim 1 wherein the processor is located in a transmitter housing containing a transmitter configured to output a fluid flow rate measurement from the vortex meter.

4. An alarming system as set forth in claim 1 wherein the control system is a distributed control system and the processor is located in a controller of the distributed control system that is configured to receive a fluid flow rate measurement from the vortex meter.

5. An alarming system as set forth in claim 1 wherein the vortex meter is installed in a fluid line for conveying liquid away from an oil and gas separator.

6. An alarming system as set forth in claim 5 wherein the alarm comprises outputting a heartbeat value in response to gas carry-under in the fluid line.

7. An alarming system as set forth in claim 1 wherein the vortex meter is installed in a fluid line conveying steam.

8. An alarming system as set forth in claim 1 wherein the processor is further configured to adjust the manner in which the vortex meter calculates a fluid flow rate measurement based on the amplitude of said oscillation.

9. An alarming system as set forth in claim 8 wherein the vortex meter is a multivariable vortex meter configured to measure mass flow rate of fluid through the flowtube.

10. An alarming system as set forth in claim 1 wherein the processor is further configured to adjust a fluid density setting of the vortex flowmeter based on said amplitude.

11. An alarming system as set forth in claim 1 further comprising a device type manager.

12. An alarming system for a control system including a vortex flowmeter of the type having a flowtube, a bluff body positioned in the flowtube for shedding vortices in a fluid when the fluid flows through the flowtube, and a pressure sensor positioned to obtain a signal indicative of a time-varying fluid pressure having an oscillation associated with the vortices, the system comprising:
  storage media for storing configuration settings for the vortex flowmeter, the configuration settings including a fluid type setting indicating a type of fluid that is expected to flow through the vortex flowmeter; and
  one or more processors configured to determine based on the signal a frequency of the oscillation and an amplitude of the oscillation, the one or more processors being further configured to, at a flow rate measurement time:
    determine a type of fluid flowing through the flowtube based on the amplitude of the oscillation,
    compare the determined type of fluid flowing through the flowtube to a type of fluid that is expected to flow through the flowtube in a process in which the vortex flowmeter is installed,
    output a flowrate measurement based on the determined frequency of the oscillation and the configuration settings stored in the storage media when the determined type of fluid is the type of fluid that is expected to flow through the flowtube in the process in which the vortex flowmeter is installed, and
    activate an alarm when the determined type of fluid differs from the type of fluid that is expected to flow through the flowtube in the process in which the vortex flowmeter is installed;
  wherein at a configuration time before the flow rate measurement time, the one or more processors are configured to determine the fluid type setting based on the determined amplitude of oscillation and a temperature measurement representative of a temperature of a fluid flowing through the flowtube and to store the fluid type setting in the storage media.

13. An alarming system as set forth in claim 12 wherein the one or more processors are located in a transmitter housing containing a transmitter configured to output information from the vortex meter about the rate of fluid flow through the flowtube.

14. An alarming system as set forth in claim 12 wherein at least one of the one or more processors is part of a portable handheld unit connected to the vortex flowmeter.

15. An alarming system as set forth in claim 12 wherein the control system is a distributed control system and the at least one of the one or more processors is further configured to associate the alarm with a function block running in the distributed control system, the function block being configured to implement a process plant control algorithm based at least in part on information received from the vortex flowmeter.

16. An alarming system as set forth in claim 12 wherein the control system is a distributed control system and the at least one of the one or more processors is located in a controller of the distributed control system that is configured to receive a fluid flow rate measurement from the vortex meter.

17. An alarming system as set forth in claim 12 further comprising a device type manager.

18. A method of alarming for use with a control system including a vortex flowmeter of the type having a flowtube, a bluff body positioned in the flowtube for shedding vortices in a fluid when the fluid flows through the flowtube, and a pressure sensor positioned to obtain a signal indicative of a time-varying fluid pressure having an oscillation associated with the vortices, the method comprising:
  determining a frequency of the oscillation and an amplitude of the oscillation based on the signal indicative of the time-varying fluid pressure obtained by the pressure sensor,
  assessing a density of a fluid flowing through the flowtube based on the amplitude,
  comparing the assessed density of the fluid to a fluid density configuration setting of the vortex meter, the fluid density configuration setting indicating a density of fluid that is expected to flow through the vortex flowmeter,
  activating an alarm when the difference between the assessed density and the fluid density configuration setting exceeds a threshold, and
  outputting a flowrate measurement based on the determined frequency of the oscillation and the configuration settings stored in the storage media when the difference between the assessed density and the fluid density configuration setting is less than the threshold.

19. A method as set forth in claim 18 wherein the control system is a distributed control system and further comprising associating the alarm with a function block running in the distributed control system, the function block being configured to implement a process plant control algorithm based at least in part on information received from the vortex flowmeter.

20. A method as set forth in claim 18 wherein activating the alarm comprises outputting a heartbeat value in response to gas carry-under in the fluid line.

* * * * *